(12) United States Patent
Lane et al.

(10) Patent No.: US 7,267,434 B2
(45) Date of Patent: Sep. 11, 2007

(54) EYEGLASSES AND METHOD OF MANUFACTURE THEREOF

(75) Inventors: Henry Welling Lane, San Luis Obispo, CA (US); Eric Rhea, San Luis Obispo, CA (US)

(73) Assignee: Dioptics Medical Products, Inc., San Luis Obispo, CA (US)

( * ) Notice: Subject to any disclaimer, the term of this patent is extended or adjusted under 35 U.S.C. 154(b) by 0 days.

(21) Appl. No.: 10/808,226

(22) Filed: Mar. 23, 2004

(65) Prior Publication Data

US 2005/0213025 A1    Sep. 29, 2005

(51) Int. Cl.
*G02C 11/08* (2006.01)

(52) U.S. Cl. .................. 351/62; 351/131; 351/158; 2/437

(58) Field of Classification Search .................. 351/41, 351/44, 62, 83–86, 158, 124, 131, 103–109; 2/435–437, 448–450
See application file for complete search history.

(56) References Cited

U.S. PATENT DOCUMENTS

| | | | |
|---|---|---|---|
| 604,238 A | 5/1898 | Nerney | |
| 2,407,518 A | 9/1946 | Schauweker | |
| D166,578 S | 4/1952 | Splaine | |
| 4,707,863 A | 11/1987 | McNeal | |
| 4,955,706 A * | 9/1990 | Schmidthaler et al. | 351/41 |
| 4,969,472 A | 11/1990 | Langley et al. | |
| 4,976,530 A | 12/1990 | Mackay et al. | |
| 5,018,223 A * | 5/1991 | Dawson et al. | 2/436 |
| 5,191,364 A | 3/1993 | Kopfer | |
| D339,596 S | 9/1993 | Kopfer | |
| 5,416,536 A | 5/1995 | Tee, Jr. | |
| 5,428,411 A | 6/1995 | Kopfer | |
| 5,614,964 A | 3/1997 | Garneau | |
| D402,681 S | 12/1998 | MacWilliamson | |
| D407,566 S | 4/1999 | Lane | |
| D408,840 S | 4/1999 | Lane | |
| 5,969,786 A | 10/1999 | Marcum | |
| D416,933 S | 11/1999 | Lane | |
| D417,461 S | 12/1999 | Lane | |
| D418,534 S | 1/2000 | Lane | |
| D419,585 S | 1/2000 | Lane | |

(Continued)

FOREIGN PATENT DOCUMENTS

WO    WO99/56942    * 11/1999    ........... 351/41

*Primary Examiner*—Huy Mai
(74) *Attorney, Agent, or Firm*—Westberg Law Offices

(57) ABSTRACT

The present invention is directed toward eyeglasses and a method of manufacture thereof. In one embodiment, an eyeglass assembly includes an eyeglass frame having lens receptacles and a rib coupled to the eyeglass frame. The rib includes a brow portion, the brow portion having side portions extending above the lens receptacles and the rib having extensions coupled to the brow portion and extending downwardly along both sides of a wearer's nose and the rib having a pliable coating on at least some of its surface. In another embodiment, method of manufacturing eyeglasses is provided. A molded rib is formed. A pliable coating is molded on at least some of the surface of the molded rib. The molded rib is affixed to an eyeglass frame having lens receptacles by at least one fastener and at least one attachment means being integral to the rib and the eyeglass frame. In another embodiment, the rib is omitted and the coating is molded to the frame.

44 Claims, 6 Drawing Sheets

U.S. PATENT DOCUMENTS

| | | | |
|---|---|---|---|
| D422,007 S | 3/2000 | Pickering et al. | |
| D428,913 S | 8/2000 | Kopfer | |
| 6,132,041 A | 10/2000 | Lin | |
| D433,697 S | 11/2000 | Lane | |
| D433,698 S | 11/2000 | Lane | |
| D434,062 S | 11/2000 | Lane | |
| D434,063 S | 11/2000 | Lane | |
| D434,064 S | 11/2000 | Lane | |
| D434,789 S | 12/2000 | Lane | |
| D435,579 S | 12/2000 | Lane | |
| 6,196,681 B1* | 3/2001 | Canavan | 351/106 |
| 6,233,342 B1 | 5/2001 | Fernandez | |
| D445,442 S | 7/2001 | Lee | |
| 6,280,030 B1 | 8/2001 | Chen | |
| D447,505 S | 9/2001 | Lane | |
| D447,506 S | 9/2001 | Lane | |
| D447,507 S | 9/2001 | Lane | |
| D447,763 S | 9/2001 | Lane | |
| D448,398 S | 9/2001 | Lane | |
| D448,399 S | 9/2001 | Lane | |
| D457,908 S | 5/2002 | Lane et al. | |
| D458,953 S | 6/2002 | Lane | |
| D462,374 S | 9/2002 | Lane et al. | |
| D467,606 S | 12/2002 | Lane | |
| D467,959 S | 12/2002 | Lane et al. | |
| D467,961 S | 12/2002 | Lane | |
| D468,339 S | 1/2003 | Lane | |
| D472,264 S | 3/2003 | Lane | |
| 6,550,914 B1* | 4/2003 | Kopfer | 351/62 |
| D477,348 S | 7/2003 | Lane | |
| 6,609,255 B2 | 8/2003 | Lane et al. | |
| D481,061 S | 10/2003 | Lane | |
| D481,062 S | 10/2003 | Lane | |
| D481,063 S | 10/2003 | Lane | |
| D481,410 S | 10/2003 | Lane | |
| D482,717 S | 11/2003 | Lane et al. | |
| 6,641,263 B2* | 11/2003 | Olney | 351/62 |
| D484,692 S | 1/2004 | Lane | |
| D487,284 S | 3/2004 | Lane | |
| D487,477 S | 3/2004 | Lane | |
| 6,749,299 B1* | 6/2004 | Hsu | 351/62 |
| 6,793,336 B2* | 9/2004 | Min | 351/62 |
| 6,938,277 B2* | 9/2005 | Lindahl | 2/434 |
| 6,969,171 B2 | 11/2005 | Lane et al. | |
| 7,036,927 B2 | 5/2006 | Kopfer | |
| 2004/0017540 A1 | 1/2004 | Matera | |
| 2004/0057008 A1* | 3/2004 | Lin | 351/124 |
| 2004/0125334 A1* | 7/2004 | Olney | 351/62 |
| 2006/0050227 A1 | 3/2006 | Fernandez et al. | |
| 2006/0072065 A1 | 4/2006 | Fernandez et al. | |

* cited by examiner

EYEGLASSES AND METHOD OF MANUFACTURE THEREOF

FIELD OF THE INVENTION

The present invention relates to the field of eyeglasses and methods of manufacture thereof.

BACKGROUND OF THE INVENTION

Eyeglasses, and particularly sunglasses, are typically constructed of a plastic or metal frame. A pair of temple pieces is attached to the frame by hinges and a pair of lenses is fitted into openings in the frame. Because the entire frame is often molded from a single material, the material must be chosen based on criteria that are often conflicting. For example, the material should have sufficient resilience that it can be formed separately from the lenses and then allow the lenses to be snapped into place. However, the material should have sufficient rigidity so that the lenses then remain in place and so that the frame retains its essential shape despite certain stresses being placed on the frame during use. In addition, it is often desired that a single frame shape can comfortably accommodate some variation in shape and size of wearers' faces. However, because the frames rest against the wearer's face and must have a certain amount of rigidity, all too often, a particular frame can only be worn comfortably by persons whose face shape and size falls within a limited range.

In addition, wearers often desire that their eyeglasses appear stylish. At the same time, producers of eyeglasses often desire that they can be produced in significant volumes and at reasonable cost. Thus, while other materials and multiple materials have been used in eyewear, they have not always achieved satisfactory results in terms of comfort, stylishness and manufacturability.

Therefore, what is needed is improved eyeglasses. What is further needed is an improved method of manufacture of eyeglasses. It is toward these ends that the present invention is directed.

SUMMARY OF THE INVENTION

The present invention is directed toward eyeglasses and a method of manufacture thereof. In one embodiment, an eyeglass assembly includes an eyeglass frame having lens receptacles and a rib coupled to the eyeglass frame. The rib includes a brow portion, the brow portion having side portions extending above the lens receptacles and the rib having extensions coupled to the brow portion and extending downwardly along both sides of a wearer's nose and the rib having a pliable coating on at least some of its surface. The rib may be affixed to the eyeglass frame by at least one fastener and at least one attachment means being integral to the rib and the eyeglass frame.

In another embodiment, method of manufacturing eyeglasses is provided. A molded rib is formed. A pliable coating is molded on at least some of the surface of the molded rib. The molded rib is affixed to an eyeglass frame having lens receptacles by at least one fastener and at least one attachment means being integral to the rib and the eyeglass frame. The rib may include a brow portion, the brow portion having side portions extending above the lens receptacles and the rib having extensions coupled to the brow portion and extending downwardly along both sides of a wearer's nose.

In a further embodiment, a method of manufacturing eyeglasses is provided. A molded eyeglass frame is formed in a first mold fixture. A pliable coating is molded on at least some of the surface of the frame in a second mold fixture.

These and other aspects of the invention are described in more detail herein.

DETAILED DESCRIPTION OF A PREFERRED EMBODIMENT

The present invention is directed toward eyeglasses and a method of manufacture thereof. A rib is formed, preferably of plastic. A pliable coating, preferably rubber, is applied to the rib. The rib is affixed to an eyeglass frame. The rib is preferably affixed to the frame with at least one fastener, preferably a screw, and at least one tab and corresponding tab receptacle. The resulting eyeglasses include the rib, the pliable coating and the frame, and are improved over prior eyeglasses in respect to comfort, stylishness and manufacturability.

Figure 1:
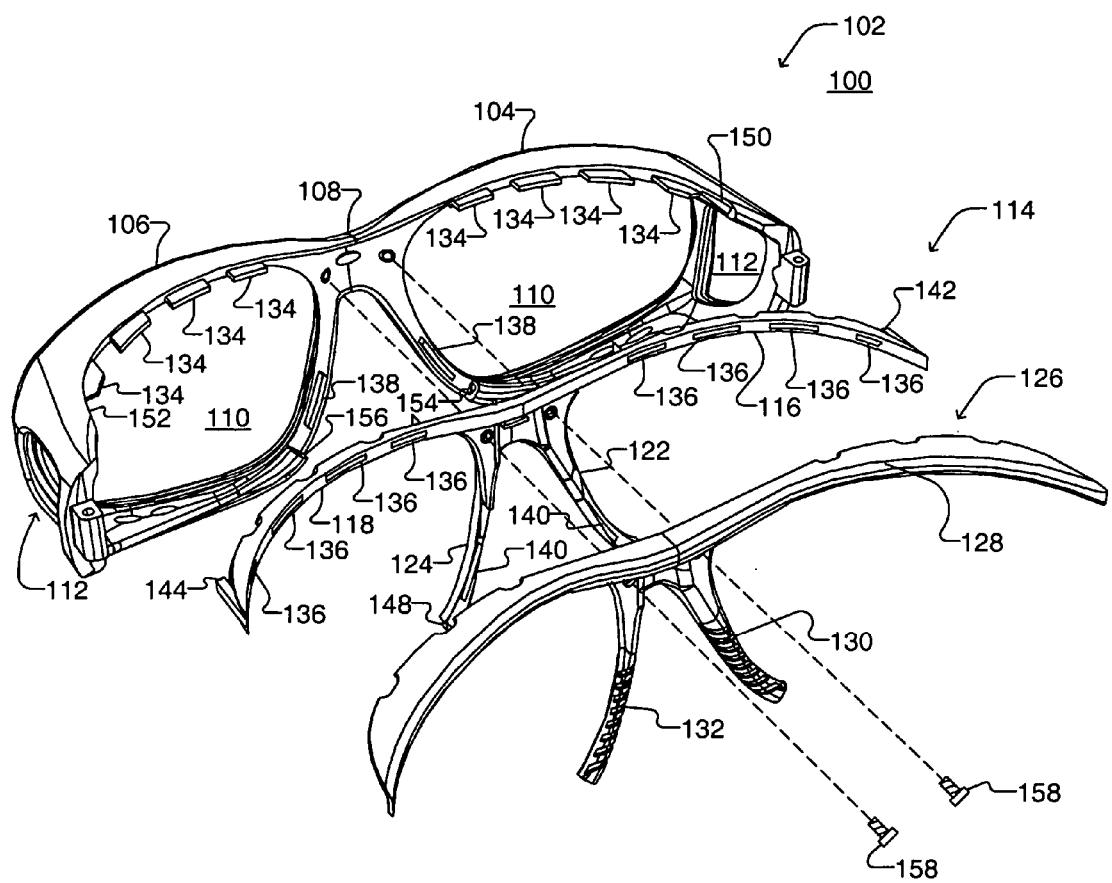
FIG. 1 illustrates an exploded rear view of an eyeglasses frame assembly in accordance with an embodiment of the present invention.

FIG. 1 illustrates an exploded rear view of an eyeglasses frame assembly 100 in accordance with an embodiment of the present invention. The frame assembly 100 includes a frame 102 which has a left side portion 104, a right side portion 106 and a nose bridge portion 108 that connects the left and rights side portions. Left and right are oriented as seen from the front of the eyeglasses when worn. The left side portion 104 and the right side portion 106 each have lens receptacles 110 for accommodating front lenses. In addition, the frame 102 may also include side lens receptacles 112 for accommodating side lenses, though it will be apparent that the side lens receptacles 112 and side lenses may be omitted.

The frame 102 is preferably molded of plastic, nylon or a similar material, though the frame 100 can be formed of any material suitable for eyeglass frames. The lens receptacles 110 and 112 preferably include a lens-retaining channel molded into the frame into which the lenses are inserted after the frame 100 is formed.

FIG. 1 shows that the frame assembly 100 also includes a rib 114. The rib 114 includes a brow portion including a left brow portion 116 and a right brow portion 118. The brow portion of the rib 114 extends across the frame 102 above the lens receptacles 110. The left and right brow portions 116, 118 preferably extend in width to positions above the lens receptacles or beyond and are contoured to the approximate shape of a person's head at the brow. In addition, the rib 114 includes a left side extension 122 and a right side extension 124. The left and right side extensions 122 and 124 extend downwardly from a middle region of the brow portion of the rib 114 and are positioned along either side of the wearer's nose.

The rib 114 is preferably also molded of plastic, nylon or a similar material, though, the rib 114 can be formed of any other suitable material. The rib 114 is also preferably molded as a separate piece from the frame 102. For example, they may be molded at different times and using different mold fixtures.

In addition, the frame assembly 100 includes a pliable coating 126, such as rubber or a similar material. The coating 126 is preferably applied over the rib 114 after the rib has been formed. For example, once the rib 114 has been formed in a first mold by a first molding process, the rib 114 is then placed in a second mold. Then, the coating 126 is molded onto the rib in this second mold by a second molding process. For example, the coating 126 may be injected into the second mold in liquid form while the rib 114 partially occupies the cavity of the second mold. As a result, the coating 126 will tend to be bonded to the rib 114 in places where the coating 126 contacts the rib 114.

Figure 2:
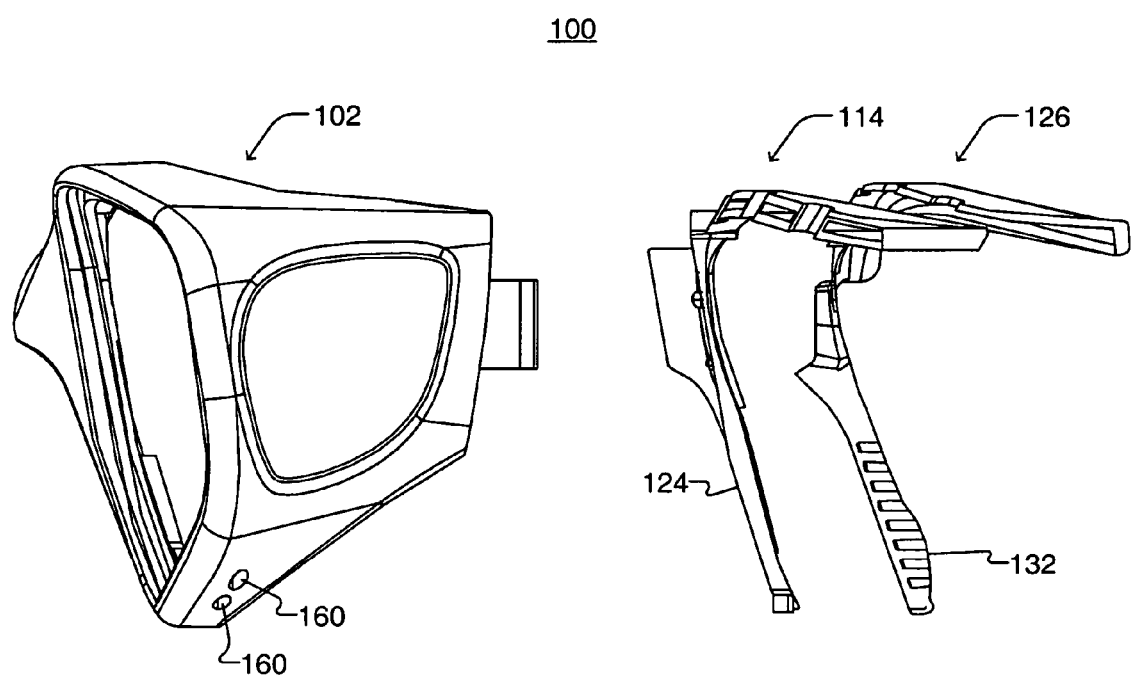
FIG. 2 illustrates an exploded side view of the eyeglasses frame assembly in accordance with an embodiment of the present invention.

FIG. 2 illustrates an exploded side view of the eyeglasses frame assembly 100 in accordance with an embodiment of the present invention. As shown in FIG. 2, the coating 126 covers surfaces of the rib 114, preferably including the top surface of the rib 114 and surfaces of the rib 114 that are exposed to the wearer. However, the coating 126 preferably does not cover any surfaces between the rib 114 and frame 102. Thus, in an embodiment, substantially all of the surfaces of the rib 114 that would otherwise be exposed may be covered by the coating 126. A lower surface 127 (FIG. 3A) of the rib 114 that can be seen only by looking up from below the rib 114 may be left exposed. The coating 126 is preferably disposed between a wearer of the eyeglasses and the rib at all places of wearer contact to the frame 100.

The pliable coating 126 is preferably of substantially uniform thickness (e.g., approximately 1.0-1.5 mm thick) except in areas of the coating 126 that potentially contact the wearer, which are preferably thicker (e.g., approximately 1.0-4.0 mm thick). Particularly, the rubber coating 126 is preferably thicker along a brow ridge 128 that potentially contacts the wearer in the brow area. In addition, the rubber coating 126 preferably includes integrally-molded nose pads, including a left nose pad 130 and a right nose pad 132 that are thicker than other areas of the coating 126 so as to provide a cushion for the wearer's nose.

After the pliable coating 126 has been applied to the rib 114, the rib 114 and coating 126 are together affixed to the frame 102. Thus, the rib 114 provides structure for the coating 126 and a means to affix the coating 126 to the frame 102. In an embodiment, the rib 114 is affixed to the frame 102 by at least one fastener (e.g., a screw) and at least one attachment means being integral to the rib 114 and to the eyeglass frame 102. By integral what is meant is that the attachment means is molded or otherwise formed into the rib 114, the frame 102 or both. For example, an attachment means may include a tab that extends from the rib 114 or frame 102 and that is inserted into a corresponding receptacle in the opposite piece. Each such receptacle preferably accommodates the corresponding tab snugly and, possibly even causing a slight distortion of the pieces when fitted together, so that the pieces are held to together at least in part by friction between the receptacle and tab.

In an embodiment, the attachment means includes a plurality of tabs 134 extending from the eyeglass frame 102. For each such tab 134, a corresponding tab receptacle 136 is formed in the rib 114. In a preferred embodiment, there are four tabs 134 formed in the left portion 104 of the frame 102 over the left lens receptacle 110 and four tabs 134 formed in the right portion 106 of the frame 102 over the right lens receptacle 112. In addition, one tab 138 extends from the frame 102 in an area adjacent to the left side of the wearer's nose and one tab 138 extends from the frame in an area adjacent to the right side of the wearer's nose. For each such tab 138, a corresponding tab receptacle 140 is formed in the rib 114. As shown in FIG. 1, the tab receptacles 136, 140 may extend through the rib 114, though this is not necessary. If the tab receptacles 136, 140 extend through the rib 114, the open ends opposite the frame 102 are covered by the coating 126.

Figure 3A:
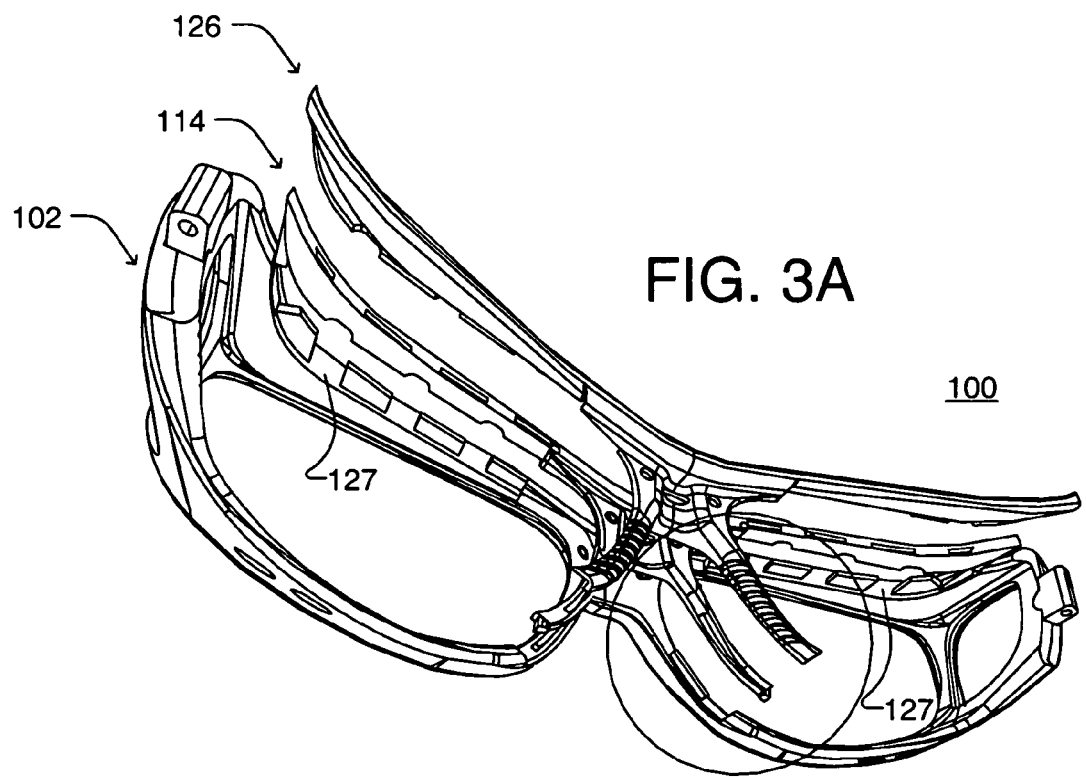
FIG. 3A illustrates an exploded rear view of the eyeglass frame assembly as seen from below in accordance with an embodiment of the present invention.
Figure 3B:
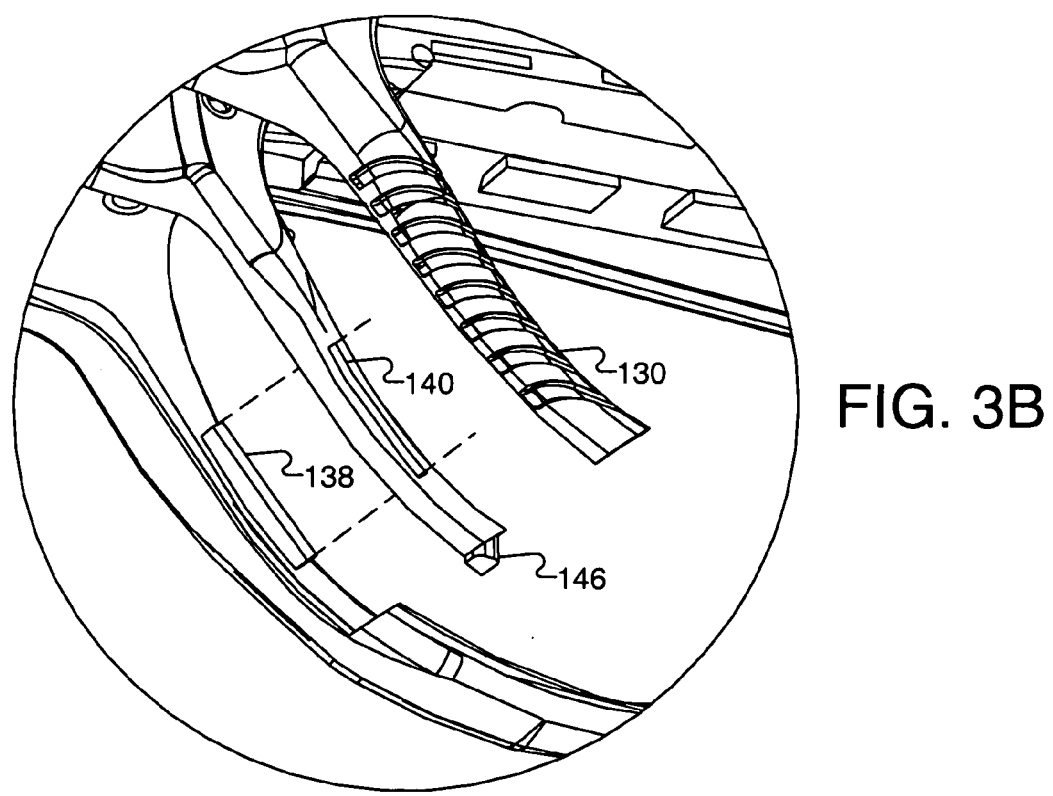
FIG. 3B illustrates an enlarged portion of the view of FIG. 3A in accordance with an embodiment of the present invention.

In an embodiment, a plurality of tabs extends from the rib 114. For each such tab, a corresponding tab receptacle is formed in the eyeglass frame 102. Preferably, the tabs extending from the rib 114 include a tab 142 near the end of the left brow portion 116 of the rib 114, a tab 144 near the end of the right brow portion 118 of the rib 114, a tab 146 (visible in FIG. 3B) near the end of the left side extension 122 of the rib, and a tab 148 near the end of the right side extension 124 of the rib 114. Corresponding to the tab 142 is a tab receptacle 150; corresponding to the tab 144 is a tab receptacle 152; corresponding to the tab 146 is a tab receptacle 154; and corresponding to the tab 148 is a tab receptacle 156. FIG. 3A illustrates an exploded rear view of the eyeglass frame assembly as seen from below in accordance with an embodiment of the present invention; FIG. 3B illustrates an enlarged portion of the view of FIG. 3A (which is circled in FIG. 3A) in accordance with an embodiment of the present invention. More particularly, FIG. 3B shows in more detail, the assembly of the rib 114 together with the coating 126 and the frame 102 in the area of the left nose pad 130.

In an embodiment, the attachment means includes a pair of screws 158 (FIG. 1). The screws preferably extend through apertures in the coating 126 and rib 114 and are affixed to the frame 102 by being threaded into the frame 102. To assemble the frame assembly, all of the tabs 134, 138 in the frame 102 and all of the tabs in the rib 142, 144, 146 and 148 are inserted into their corresponding receptacles. The screws 158 are then inserted to secure the rib 114 to the frame 102. The tabs 142, 144, 146 and 148 at the extremities of the rib 114 and their corresponding receptacles secure the extremities to the frame 102, while the tabs 134, 138 and their corresponding receptacles secure intermediate portions of the rib to the frame 102.

Figure 4:
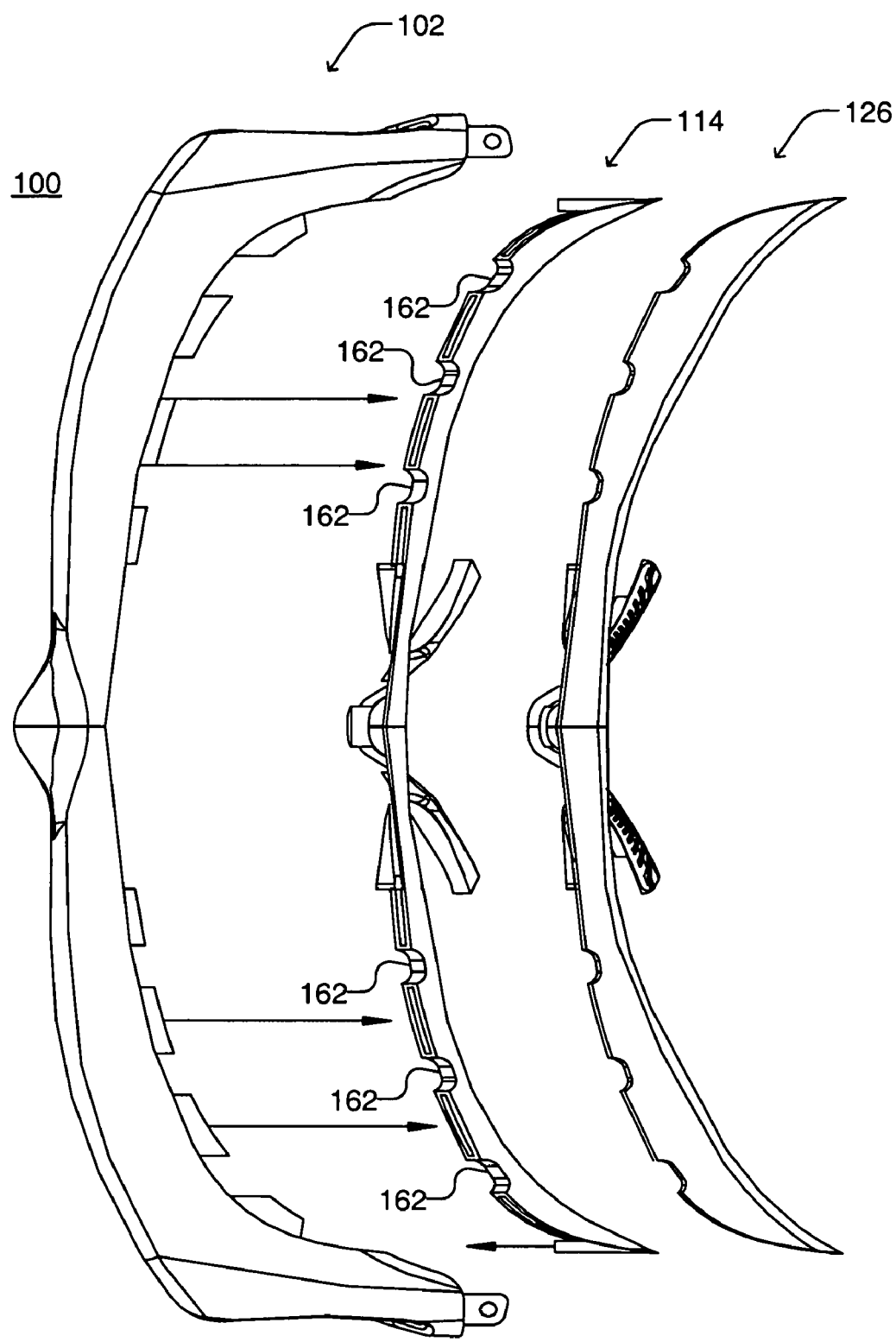
FIG. 4 illustrates an exploded top view of the eyeglass frame assembly in accordance with an embodiment of the present invention.

In an embodiment, the eyeglasses frame 100 includes a plurality of air vents 160. FIG. 4 illustrates an exploded top view of the eyeglass frame assembly 100 in accordance with an embodiment of the present invention. Particularly, FIG. 4 shows in more detail the how the vents 160 may be formed. One or more of the air vents 160 may be formed by a gap between the rib 114 and the frame 102. To form the gap, the rib 114 may include slots 162 (FIG. 4) that are aligned with spaces between the tabs 134. To provide the spaces, the tabs 134 are preferably spaced apart on the brow portion of the frame 102. Thus, one or more of the air vents 160 may be positioned between pairs of the tabs 134.

In addition, the vents are preferably formed such that at least one air vent has a central axis that is substantially sloped with respect to a top surface of the eyeglass frame 102. This sloping is shown in FIG. 4 by a sloping surface of each slot 162 and can also be seen in FIG. 2. In addition, the corresponding portion 127 (FIG. 3A) of the frame 102 from which the tabs 134 extend preferably has a corresponding slope. This can be seen in FIG. 3A in which the surface 127 that meets with the rib 114 above the lens receptacles 110 is substantially sloped with respect to a top surface of the eyeglass frame 102. As a result, the vents allow air to enter the area between the lenses and the wearer to reduce moisture and fogging, but also to prevent light from entering the wearer's eyes. Light-blocking vents for eyewear are described in U.S. patent application Ser. No. 10/607,068, filed Jun. 25, 2003, the entire contents of which are hereby incorporated by reference. In addition, vents 160 may be formed through the frame 102, as shown in FIG. 2.

Figure 5:
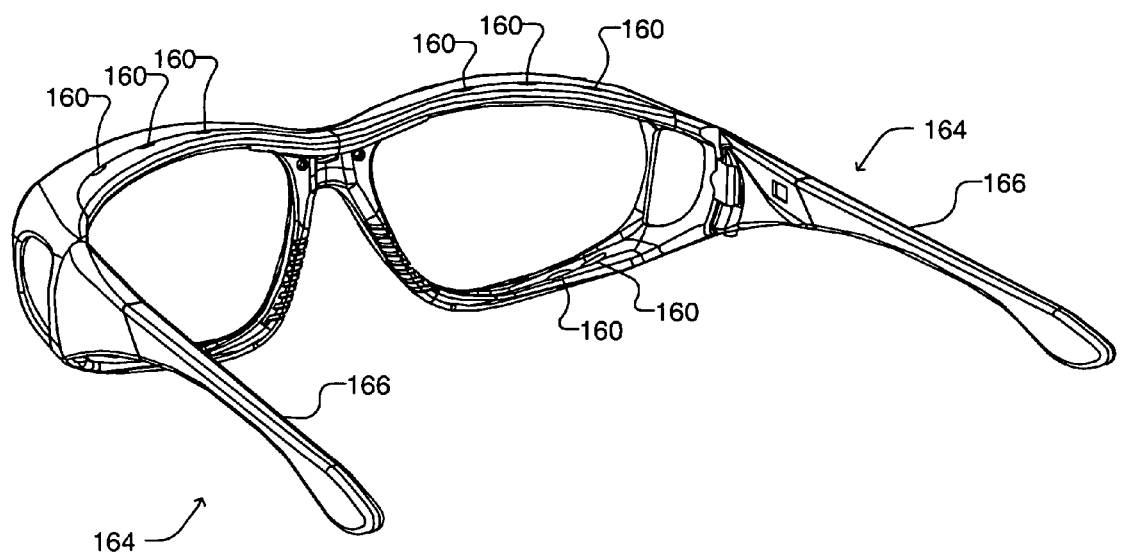
FIG. 5 illustrates a rear view of the eyeglass frame assembly in accordance with an embodiment of the present invention.
Figure 6:
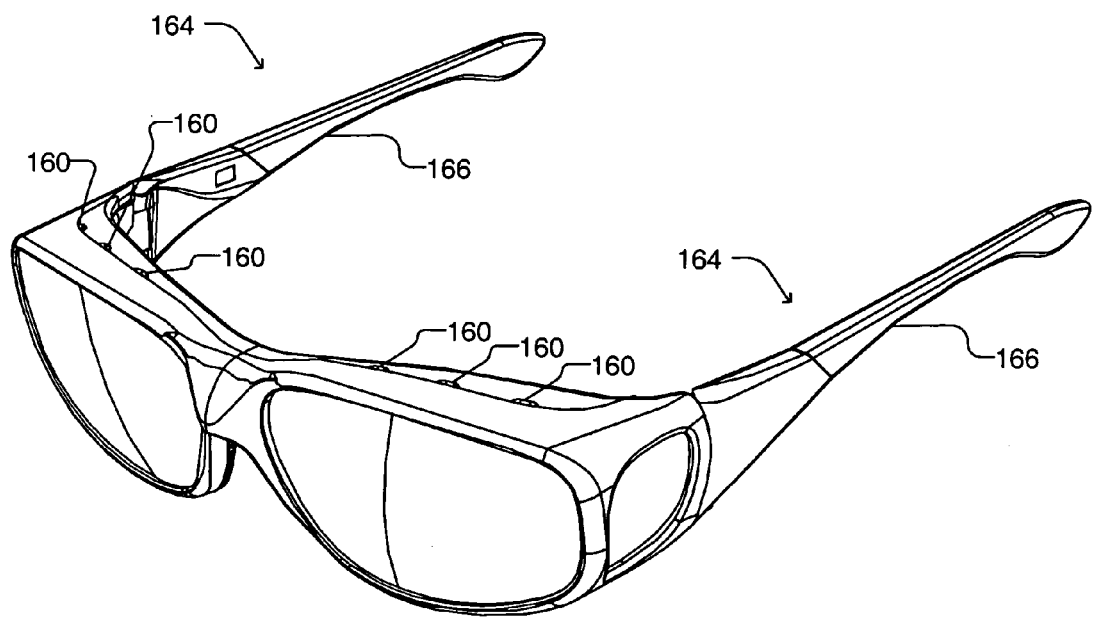
FIG. 6 illustrates front view of the eyeglass frame assembly in accordance with an embodiment of the present invention.

FIG. 5 illustrates a rear view of the eyeglass frame assembly 100 in accordance with an embodiment of the present invention, while FIG. 6 illustrates front view of the eyeglass frame assembly in accordance with an embodiment of the present invention. Thus, FIGS. 5 and 6 illustrate the assembly 100 after the rib 114, together with the coating 126, has been affixed to the frame 100. In addition, FIGS. 5 and 6 show earpieces 164 which may be separately formed (by injection molding) and attached to the frame assembly 100. For enhanced visual appeal, the frame 102 and coating 126 may be of contrasting colors. In addition, earpieces may be formed in the same color as the frame 102 and may also include portion 166 that is color-matched to the coating 126.

As mentioned the rib 114 is preferably molded as a separate piece from the frame 102. In an alternate embodiment, the rib 114 is molded together with the frame 102 and, thus, the rib 114 is omitted as a separate piece. In this embodiment, once the frame 102 has been formed in a first mold by a first molding process, the frame 102 is then placed in a second mold. Then, the coating 126 is molded onto the frame 102 in this second mold by a second molding process. For example, the coating 126 may be injected into the second mold in liquid form while the frame 102 partially occupies the cavity of the second mold. As a result, the coating 126 will tend to be bonded to the frame 102 in places where the coating 126 contacts the frame 102. The resulting eyeglasses will have essentially the same features and appearance as the eyeglasses illustrated in FIGS. 1-6 except that the rib 114 is not present as a separate piece.

While the foregoing has been with reference to particular embodiments of the invention, it will be appreciated by those skilled in the art that changes in these embodiments may be made without departing from the principles and spirit of the invention, the scope of which is defined by the appended claims.

What is claimed is:

1. An eyeglass assembly comprising:
an eyeglass frame having lens receptacles; and
a rib coupled to the eyeglass frame and including a brow portion, the brow portion having side portions extending above the lens receptacles and the rib having extensions coupled to the brow portion and extending downwardly along both sides of a wearer's nose, each side portion and each extension terminating at an endpoint, the rib having a pliable coating on at least some of its surface, wherein the rib is affixed to the eyeglass frame by at least one fastener and a plurality of attachment means, the fastener being separate from the rib and the eyeglass frame and passing through an aperture of one of the rib and the eyeglass frame and secured to another one of the rib and the eyeglass frame, and the plurality of attachment means being integral to the rib and the eyeglass frame and comprising a plurality of tabs extending from the eyeglass frame and for each tab extending from the eyeglass frame a corresponding tab receptacle in the rib.

2. The eyeglass assembly according to claim 1, wherein the at least one fastener comprises a screw.

3. The eyeglass assembly according to claim 1, wherein the fastener affixes the rib to a nose bridge portion of the frame.

4. The eyeglass assembly according to claim 1, wherein the eyeglasses further comprises a plurality of air vents including at least one air vent positioned between a pair of the tabs.

5. The eyeglass assembly according to clam 4, wherein the at least one air vent has a central axis that is substantially sloped with respect to a top surface of the eyeglass frame.

6. The eyeglass assembly according to claim 1, the pliable coating being molded to the rib.

7. The eyeglass assembly according to claim 6, the pliable coating covering substantially all of the plastic rib that would otherwise be exposed.

8. The eyeglass assembly according to claim 1, the pliable coating being disposed between a wearer of the eyeglasses and the rib at all places of wearer contact to the frame.

9. The eyeglass assembly according to claim 1, wherein one or more of the tab receptacles accommodates the corresponding tab causing a distortion when fitted together.

10. An eyeglass assembly comprising:
an eyeglass frame having lens receptacles; and
a rib coupled to the eyeglass frame and including a brow portion, the brow portion having side portions extending above the lens receptacles and the rib having extensions coupled to the brow portion and extending downwardly along both sides of a wearer's nose, each side portion and each extension terminating at an endpoint, the rib having a pliable coating on at least some of its surface, wherein the rib is a frame by a plurality of attachment means being integral to the frame and rib, the plurality of attachment means comprising:
a plurality of tabs extending from the eyeglass frame and for each tab extending from the eyeglass frame a corresponding tab receptacle in the rib; and
a plurality of tabs extending from the rib and for each tab extending from the rib a corresponding tab receptacle in the eyeglass frame.

11. The eyeglass assembly according to claim 10, wherein at least some of the tab receptacles in the rib are positioned in the brow portion of the rib.

12. The eyeglass assembly according to claim 10, wherein the plurality of tabs extending from the rib includes at least one tab positioned near each of the left and right ends of the brow portion of the rib.

13. The eyeglass assembly according to claim 10, wherein at least some of the tab receptacles in the rib are positioned in the extensions.

14. The eyeglass assembly according to claim 10, wherein the plurality of tabs extending from the rib includes at least one tab positioned near each of the ends of the extensions.

15. An eyeglass assembly comprising:
an eyeglass frame having a left frame portion including a left lens receptacle and a right frame portion including a right lens receptacle, and a nose bridge portion connecting the left frame portion and the right frame portion; and
a rib coupled to an inner side of the eyeglass frame and including a brow portion, the brow portion having a left side portion, a right side portion and a middle portion, the left side portion positioned above the left lens receptacle and the right side portion positioned above the right lens receptacle, the rib including a left nosepiece extension extending downwardly from the middle portion and along the left frame portion and a right nosepiece extension extending downwardly from the middle portion and along the right frame portion, each of the left and right side portions and each of the left and right nosepiece extensions terminating at an endpoint, the rib having a pliable coating on at least some of its surface, wherein the rib is affixed to the eyeglass frame by at least one fastener and a plurality of attachment means, the fastener being separate from the rib and the eyeglass frame and passing through an aperture of one of the rib and the eyeglass frame and secured to another one of the rib and the eyeglass frame, and the plurality of attachment means being integral to the rib and the eyeglass frame and comprising a plurality of tabs extending from the eyeglass frame and for each tab extending from the eyeglass frame a corresponding tab receptacle in the rib; and a plurality of air vents including at least one air vent positioned between a pair of the tabs.

16. The eyeglass assembly according to claim 15, wherein the at least one fastener comprises a screw.

17. The eyeglass assembly according to claim 15, wherein the the fastener affixes the middle portion of the rib to the nose bridge portion of the frame.

18. The eyeglass assembly according to claim 15, wherein the at least one air vent has a central axis that is substantially sloped with respect to a top surface of the eyeglass frame.

19. The eyeglass assembly according to claim 15, the pliable coating being molded to the rib.

20. The eyeglass assembly according to claim 19, the pliable coating covering substantially all of the plastic rib that would otherwise be exposed.

21. The eyeglass assembly according to claim 15, the pliable coating being disposed between a wearer of the eyeglasses and the rib at all places of wearer contact to the frame.

22. An eyeglass assembly comprising:

an eyeglass frame having a left frame portion including a left lens receptacle and a right frame portion including a right lens receptacle, and a nose bridge portion connecting the left frame portion and the right frame portion; and a rib coupled to an inner side of the eyeglass frame and including a brow portion, the brow portion having a left side portion, a right side portion and a middle portion, the left side portion positioned above the left lens receptacle and the right side portion positioned above the right lens receptacle, the rib including a left nosepiece extension extending downwardly from the middle portion and along the left frame portion and a right nosepiece extension extending downwardly from the middle portion and along the right frame portion, each of the left and right side portions and each of the left and right nosepiece extensions terminating at an endpoint, the rib having a pliable coating on at least some of its surface, wherein the rib is affixed to the eyeglass frame by a plurality of attachment means being integral to the frame and rib, the plurality of attachment means comprising:

a plurality of tabs extending from the eyeglass frame and for each tab extending from the eyeglass frame a corresponding tab receptacle in the rib; and a plurality of tabs extending from the rib and for each tab extending from the rib a corresponding tab receptacle in the eyeglass frame.

23. The eyeglass assembly according to claim 22, wherein at least some of the tab receptacles in the rib are positioned in the brow portion of the rib.

24. The eyeglass assembly according to claim 22, wherein the plurality of tabs extending from the rib includes at least one tab positioned near each of the left and right ends of the brow portion of the rib.

25. The eyeglass assembly according to claim 22, wherein at least some of the tab receptacles in the rib are positioned in the left and right nosepiece extensions.

26. The eyeglass assembly according to claim 22, wherein the plurality of tabs extending from the rib includes at least one tab positioned near each of the ends of the left and right nosepiece extensions.

27. The eyeglass assembly according to claim 22, wherein the rib is affixed to the frame by at least one fastener.

28. The eyeglass assembly according to claim 27, wherein the at least one fastener comprises a screw affixed to the frame through an aperture in the rib.

29. An eyeglass assembly comprising:

an eyeglass frame having a left frame portion including a left lens receptacle and a right frame portion including a right lens receptacle, and a nose bridge portion connecting the left frame portion and the right frame portion; and a rib coupled to an inner side of the eyeglass frame and including a brow portion, the brow portion having a left side portion, a right side portion and a middle portion, the left side portion positioned above the left lens receptacle and the right side portion positioned above the right lens receptacle, the rib including a left nosepiece extension extending downwardly from the middle portion and along the left frame portion and a right nosepiece extension extending downwardly from the middle portion and along the right frame portion, each of the left and right side portions and each of the left and right nosepiece extensions terminating at an endpoint, the rib having a pliable coating on at least some of its surface, wherein the rib is affixed to the eyeglass frame by a plurality of attachment means being integral to the frame and rib, the plurality of attachment means comprising:

a plurality of tabs extending from the eyeglass frame and for each tab extending from the eyeglass frame a corresponding tab receptacle in the rib, the plurality of tabs including at least one tab positioned in the left nose piece extension and the right nosepiece extension and a plurality of tabs positioned spaced apart in the brow portion; and a plurality of tabs extending from the rib and for each tab extending from the rib a corresponding tab receptacle in the eyeglass frame, the plurality of tabs including tabs positioned at each of the left and right ends of the brow portion of the rib, the end of the left nose piece extension and the end of the right nosepiece extension.

30. The eyeglass assembly according to claim 29, wherein the rib is affixed to the frame by at least one fastener.

31. The eyeglass assembly according to claim 30, wherein the at least one fastener comprises a screw affixed to the nose bridge portion of the frame through an aperture in the rib.

32. The eyeglass assembly according to claim 29, further comprising a plurality of air vents, each air vent positioned between a pair of the tabs.

33. The eyeglass assembly according to clam 32, wherein the at least one air vent has a central axis that is substantially sloped with respect to a top surface of the eyeglass frame.

34. A method of manufacturing eyeglasses comprising:
forming a molded rib that includes left, middle, and right brow portions and left and right nosepiece extensions, the middle brow portion coupling the left and right brow portions and the left and right nosepiece extensions together, each of the left and right brow portions and each of the left and right nosepiece extensions terminating at an endpoint;
molding a pliable coating on at least some of the surface of the molded rib; and
affixing the molded rib to an eyeglass frame by at least one fastener, the fastener being separate from the rib and the eyeglass frame and passing through an aperture of one of the rib and the eyeglass frame and secured to another one of the rib and the eyeglass frame and a plurality of attachment means being integral to the rib and the eyeglass frame, the plurality of attachment means comprising a plurality of tabs extending from the eyeglass frame and for each tab extending from the eyeglass frame a corresponding tab receptacle in the rib
wherein forming the rib comprises forming a plurality of slots for air vents including at least one air vent positioned between a pair of the tabs.

35. The method according to claim 34, wherein the frame includes lens receptacles, the left and right brow portion extending above the lens receptacles, the left and right nosepiece extensions extending downwardly along both sides of a wearer's nose.

36. The method according to claim 34, wherein the at least one fastener comprises a screw.

37. The method according to claim 34, wherein the fastener affixes the rib to a nose bridge portion of the frame.

38. The method according to claim 34, the pliable coating being molded to the rib.

39. The method according to claim 38, wherein the rib is formed in a first mold and then placed in a second mold for molding the pliable coating to the rib.

40. The method according to claim 38, the pliable coating covering substantially all of the plastic rib that would otherwise be exposed.

41. The method according to claim 38, the pliable coating being disposed between a wearer of the eyeglasses and the rib at all places of wearer contact to the frame.

42. The method according to claim 34, further comprising attaching earpieces to the eyeglass frame.

43. An eyeglass assembly comprising:
an eyeglass frame having lens receptacles; and
a rib coupled to the eyeglass frame by a plurality of tabs, the rib including left, middle, and right brow portions and left and right nosepiece extensions, the middle brow portion coupling the left and right brow portions and the left and right nosepiece extensions together, each of the left and right brow portions and each of the left and right nosepiece extensions terminating at an endpoint, the rib including at least one air vent positioned between a pair of the tabs.

44. The eyeglass assembly according to claim 43, wherein the left brow portion is positioned above a left lens receptacle of the eyeglass frame and the right brow portion is positioned above a right lens receptacle of the eyeglass frame, the rib having a pliable coating on at least some of its surface.

* * * * *

UNITED STATES PATENT AND TRADEMARK OFFICE
CERTIFICATE OF CORRECTION

PATENT NO. : 7,267,434 B2
APPLICATION NO. : 10/808226
DATED : September 11, 2007
INVENTOR(S) : Henry Welling Lane and Eric Rhea It is certified that error appears in the above-identified patent and that said Letters Patent is hereby corrected as shown below:

Column 6, line 36, the phrase, "wherein the rib is a frame" should read --wherein the rib is affixed to the eyeglass frame--; and
Column 7, line 27, the phrase "the the fastener" should read --the fastener--.

Signed and Sealed this

Twenty-eighth Day of October, 2008

JON W. DUDAS
*Director of the United States Patent and Trademark Office*